(12) United States Patent
Yang et al.

(10) Patent No.: US 9,722,844 B2
(45) Date of Patent: Aug. 1, 2017

(54) DATA TRANSMISSION METHOD, DATA DEMODULATION METHOD, APPARATUS AND SYSTEM

(71) Applicant: FUJITSU LIMITED, Kawasaki-shi, Kanagawa (JP)

(72) Inventors: Xianjun Yang, Beijing (CN); Xin Wang, Beijing (CN); Jian Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/059,775

(22) Filed: Mar. 3, 2016

(65) Prior Publication Data

US 2016/0261449 A1 Sep. 8, 2016

(30) Foreign Application Priority Data

Mar. 6, 2015 (CN) .......................... 2015 1 0101095

(51) Int. Cl.
*H04L 27/26* (2006.01)
*H04B 17/354* (2015.01)

(52) U.S. Cl.
CPC ....... *H04L 27/2646* (2013.01); *H04B 17/354* (2015.01)

(58) Field of Classification Search
CPC ...... H04L 25/038; H04L 27/26; H04B 17/354
See application file for complete search history.

(56) References Cited

U.S. PATENT DOCUMENTS

| 8,824,602 | B2* | 9/2014 | Das | H04L 25/03885 |
| | | | | 375/340 |
| 9,461,862 | B2* | 10/2016 | Holden | H04L 27/2637 |
| 2015/0333944 | A1* | 11/2015 | Bae | H04L 25/03821 |
| | | | | 375/296 |

* cited by examiner

*Primary Examiner* — Jaison Joseph
(74) *Attorney, Agent, or Firm* — Myers Wolin, LLC

(57) ABSTRACT

The transmission method includes: performing first-time series-parallel conversion on modulation symbols, and allocating the data to different subcarriers, by a sender side; performing second-time series-parallel conversion on the data allocated to each subcarrier, modulating the parallel data to Slepian signals orthogonal to each other; summing up the data modulated to different Slepian signals; further modulating the data to a subcarrier; and summing up the data in all subcarriers to form transmission signals. The demodulation method includes: calculating a pseudo-inverse of a matrix formed by subcarrier signals of a sender side by a receiver side; performing subcarrier demodulation on reception signals by using columns of the calculated pseudo-inverse matrix; and performing matching filtering demodulation on signals in each subcarrier by using Slepian signals orthogonal to each other to obtain estimation values of modulation symbols of the sender side.

9 Claims, 4 Drawing Sheets

DATA TRANSMISSION METHOD, DATA DEMODULATION METHOD, APPARATUS AND SYSTEM

CROSS REFERENCE TO RELATED APPLICATIONS

This application claims priority from Chinese Patent Application No. 201510101095.0 filed Mar. 6, 2015, the contents of which are herein wholly incorporated by reference.

FIELD

The present disclosure relates to the field of communications, and in particular to a data transmission method, a data demodulation method, an apparatus and a system.

BACKGROUND

In the past more than ten years, in order to satisfy rapid increase of mobile communication data and application, a multicarrier transmission technology has been widely used in wideband wireless communication systems. A most outstanding feature of a multicarrier system is that it is able to efficiently improve robustness to multipath channel fading, and has a very high spectral efficiency. Orthogonal frequency division multiplexing (OFDM) is the most popular technology in the multicarrier system, and has been applied to the fourth generation (4G) mobile communication systems, wireless local area networks (WLANs), and digital audio broadcasting (DAB), etc. However, there still exist some drawbacks in the OFDM, such as having very large out-of-band leakage, and being sensitive to subcarrier frequency offset, etc.

The main cause that the OFDM has relatively large out-of-band leakage is that the OFDM adopts rectangular signals as its shaping filter, and a peak value of the first side lobe of the waveform of the rectangular signal is lower than a peak value of the main lobe by 13 dB only, which results in relatively large spectral leakage. In order to lower the spectral leakage, a rectangular filter may be replaced with a filter having smooth edges, such as a cosine filter. However, the spectral efficiency of the filter having smooth edges is lowered while the out-of-band leakage is reduced.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

In order to solve the problem pointed out in the Background, a data transmission method, a data demodulation method, an apparatus and a system are proposed in this application, so that out-of-band leakage may be lowered while spectral efficiency is not reduced.

According to a first aspect of the embodiments of the present disclosure, there is provided a data transmission method, applicable to a transmitter in a multicarrier communication system, the method including:

performing constellation modulation on an information bit stream of data to be transmitted to obtain modulation symbols of the data to be transmitted;

performing series-parallel conversion on the modulation symbols, and allocating the data to different subcarriers;

performing series-parallel conversion on the data allocated to each subcarrier;

modulating parallel data corresponding to each subcarrier to multiple Slepian signals orthogonal to each other;

summing up data corresponding to the same subcarrier but modulated to different Slepian signals;

modulating summed data corresponding to each subcarrier to a corresponding subcarrier; and summing up data in all subcarriers to form transmission signals.

According to a second aspect of the embodiments of the present disclosure, there is provided a data demodulation method, applicable to a receiver in a multicarrier communication system, the method including:

calculating a Moore-Penrose pseudo-inverse of a matrix formed by subcarrier signals of a sender side;

performing subcarrier demodulation on reception signals by using analog signals formed by columns of the calculated pseudo-inverse matrix; and performing matching filtering demodulation on signals in each subcarrier by using Slepian signals orthogonal to each other to obtain estimation values of modulation symbols of the sender side.

According to a third aspect of the embodiments of the present disclosure, there is provided a transmitter in a multicarrier communication system, including:

a first modulating unit configured to perform constellation modulation on an information bit stream of data to be transmitted to obtain modulation symbols of the data to be transmitted;

a first series-parallel converting unit configured to perform series-parallel conversion on the modulation symbols, and allocate the data to different subcarriers;

a second series-parallel converting unit configured to perform series-parallel conversion on the data allocated to each subcarrier;

a second modulating unit configured to modulate parallel data corresponding to each subcarrier to multiple Slepian signals orthogonal to each other;

a first calculating unit configured to sum up data corresponding to the same subcarrier but modulated to different Slepian signals;

a third modulating unit configured to modulate summed data corresponding to each subcarrier to a corresponding subcarrier; and a second calculating unit configured to sum up data in all subcarriers to form transmission signals.

According to a fourth aspect of the embodiments of the present disclosure, there is provided a receiver in a multicarrier communication system, including:

a calculating unit configured to calculate a Moore-Penrose pseudo-inverse of a matrix formed by subcarrier signals of a sender side;

a first demodulating unit configured to perform subcarrier demodulation on reception signals by using analog signals formed by columns of the calculated pseudo-inverse matrix; and a second demodulating unit configured to perform matching filtering demodulation on signals in each subcarrier by using Slepian signals orthogonal to each other to obtain estimation values of modulation symbols of the sender side.

According to a fifth aspect of the embodiments of the present disclosure, there is provided a multicarrier communication system, including a transmitter and a receiver, wherein, the transmitter is configured to:

perform constellation modulation on an information bit stream of data to be transmitted to obtain modulation symbols of the data to be transmitted;

perform series-parallel conversion on the modulation symbols, and allocate the data to different subcarriers;

perform series-parallel conversion on the data allocated to each subcarrier;

modulate parallel data corresponding to each subcarrier to multiple Slepian signals orthogonal to each other;

sum up data corresponding to the same subcarrier but modulated to different Slepian signals;

modulate summed data corresponding to each subcarrier to a corresponding subcarrier; and sum up data in all subcarriers to form transmission signals;

and the receiver is configured to:

calculate a Moore-Penrose pseudo-inverse of a matrix formed by subcarrier signals of a sender side;

perform subcarrier demodulation on reception signals by using analog signals formed by columns of the calculated pseudo-inverse matrix; and perform matching filtering demodulation on signals in each subcarrier by using Slepian signals orthogonal to each other to obtain estimation values of modulation symbols of the sender side.

An advantage of the embodiments of the present disclosure exists in that with the methods, apparatuses or system of this application, out-of-band leakage may be lowered, and robustness to subcarrier frequency offset may be improved.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

Figure 1:
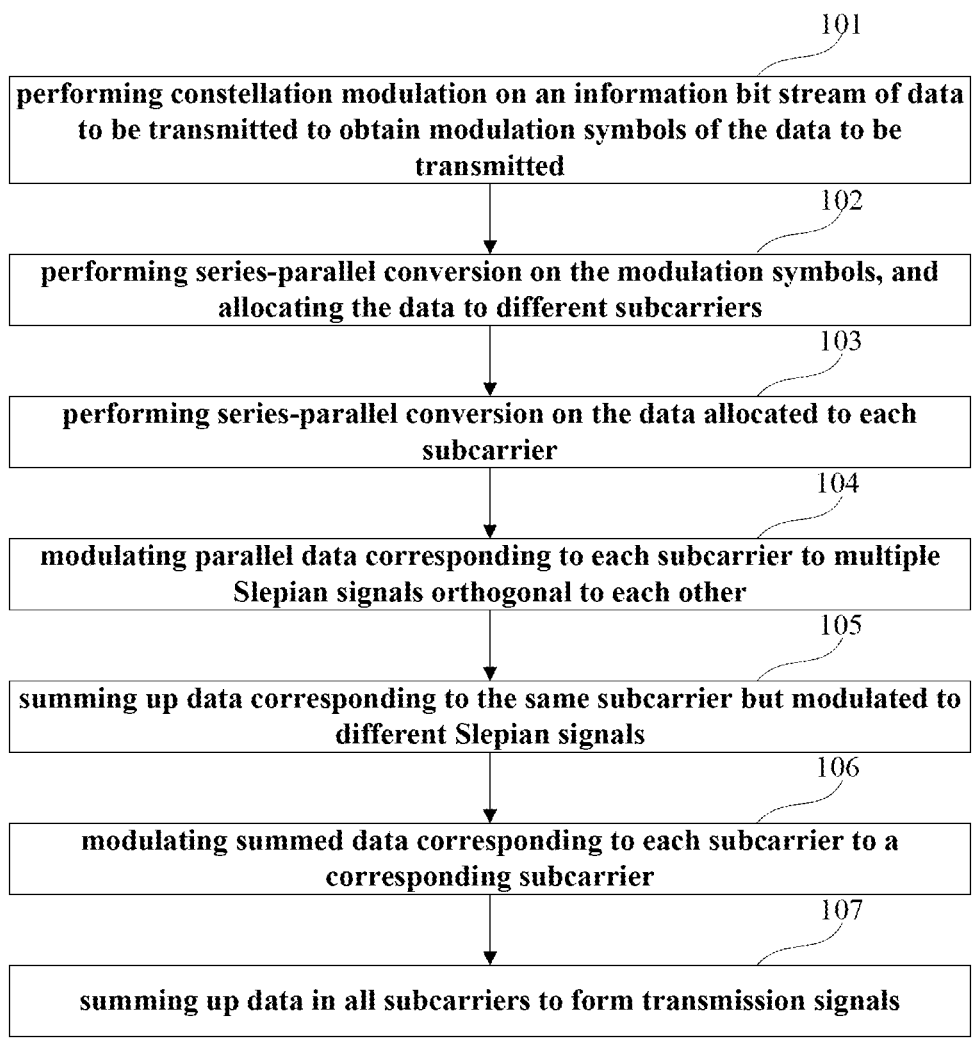
FIG. 1 is a flowchart of the data transmission method of Embodiment 1.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In order to ensure that a spectral efficiency is not lowered, a data transmission method, a data demodulation method, an apparatus and a system based on Slepian signals (Slepian basis) are proposed in this application. With this application, out-of-band leakage may be lowered, and robustness to subcarrier frequency offset may be improved.

In order that particular embodiments of this application to be more clear and easy to be understood, principles of the Slepian basis shall first be introduced below in brief. The Slepian basis includes a consecutive Slepian basis and a discrete Slepian basis.

The consecutive Slepian basis is prolate spheroidal wave functions (PSWFs), which give a minimum width occupied by a band-limited signal in a time domain. For any time interval T>0 and bandwidth B>0, the PSWFs are real-value functions $\Psi_0(t)$, $\Psi_1(t)$, $\Psi_2(t)$, ... satisfying the following properties:

(1) for any t, $\Psi_i(t)$ is a real number solution of the following formula:

$$\lambda_i \psi_i(t) = \int_0^T \frac{\sin 2\pi B(t-s)}{\pi(t-s)} \psi_i(s) ds, \qquad \text{(Formula 1)}$$

$$i = 0, 1, 2, \ldots ;$$

where, $\lambda_i$ is a positive real eigenvalue in Formula 1, which satisfies $\lambda_0 > \lambda_1 > \ldots$, former 2 TB eigenvalues being extremely close to 1, and the rest eigenvalues rapidly dropping to 0, the parameter 2 TB being referred to as a time bandwidth product;

(2) a bandwidth of the function $\Psi_i(t)$ is limited within $\mathscr{F}_B = [-B,B]$, and is orthogonally normalized in a real-number domain:

$$\int_{-\infty}^{\infty} \psi_i(t)\psi_j(t)\,dt = \begin{cases} 0, & i \neq j \\ 1, & i = j \end{cases} i, j = 0, 1, 2, \ldots;$$ (Formula 2)

(3) within a time interval 0≤t≤T, the function $\Psi_i(t)$ is orthogonal:

$$\int_0^T \psi_i(t)\psi_j(t)\,dt = \begin{cases} 0, & i \neq j \\ \lambda_i, & i = j \end{cases} i, j = 0, 1, 2, \ldots.$$ (Formula 3)

It is shown by the above (2) and (3) properties that the PSWFs are band-limited signals, which are dual orthogonal, that is, they are orthogonal within a real-number domain and a finite time interval 0≤t≤T. Hence, a band-limited signal f(t) may be approximated as:

$$f(t) = \sum_{j=0}^{J-1} \beta_j \psi_j(t);$$ (Formula 4)

where, $$\beta_j = \frac{1}{\lambda_j} \int_0^T f(t)\Psi_j(t)\,dt, \text{ and } J \geq 2TB.$$

The discrete Slepian basis is discrete prolate spheroidal sequences (DPSSs), which are real-number solutions of the following formula:

$$\sum_{n'=0}^{N-1} \frac{\sin 2\pi W(n-n')}{\pi(n-n')} v_k[n'] = \lambda_k v_k[n];$$ (Formula 5)

where, k=0, 1, ..., N−1, n=0, ±1, ±2, ..., and 0<W<½ is a normalized bandwidth; and the DPSSs are normalized functions, that is, $$\sum_{j=0}^{N-1} v_k^2[j] = 1.$$ (Formula 6)

Similar to the PSWFs, the DPSSs are also dual orthogonal, that is, $$\sum_{n=0}^{N-1} v_i[n]v_j[n] = \lambda_i \sum_{n=-\infty}^{\infty} v_i[n]v_j[n] = \delta_{ij};$$ (Formula 7)

where, $1=0, 1, \ldots, N-1$, $j=0, 1, \ldots, N-1$. Hence, a band-limited sequence $h_n$ may be approximated as:

$$h_n = \sum_{j=0}^{J-1} \gamma_j v_j[n];$$ (Formula 8)

where, $$\gamma_j = \sum_{n=0}^{N-1} h_n v_j[n], \text{ and } J \geq 2NW, n = 0, 1, 2, \ldots$$

Particular implementations of this embodiment shall be described below with reference to the drawings. In this embodiment, let a carrier frequency of a transmission signal be $f_o$, and a moving speed of a terminal be v, then a coherent time of a channel is:

$$T_c = \frac{3 \times 10^8}{f_0 v}.$$

In order that a channel in each subcarrier is a slowly-attenuated channel, a symbol length T of a signal should be less than $T_c$, such as letting $T=T_c/5$; let latency expansion of a channel be $\sigma_\tau$, and in order that the channel in each subcarrier is flatly faded, a subcarrier interval Δf should satisfy Δf<1/$\sigma_\tau$, such as letting Δf=⅓$\sigma_\tau$, then the time bandwidth product of the Slepian basis is:

λ=2NW=TΔf.

Let a sampling interval be $T_s$, then there will be N=T/$T_s$ sampling values in one symbol. There are λ mutually-orthogonal Slepian signals $\Psi_k(t)$ in the Slepian basis with a time bandwidth product λ; wherein, properties of $\Psi_k(t)$ are as described above. In this embodiment, former $N_p \leq \lambda$ Slepian signals are selected as mutually-overlapped shaping filters in each subcarrier, then a spectral efficiency of the multicarrier system is $$\eta = \frac{N_p}{T\Delta f} = \frac{N_p}{\lambda}.$$

Embodiment 1

This embodiment provides a data transmission method, applicable to a transmitter in a multicarrier communication system. FIG. 1 is a flowchart of the method. As shown in FIG. 1, the method includes:

step 101: performing constellation modulation on an information bit stream of data to be transmitted to obtain modulation symbols of the data to be transmitted;

step 102: performing series-parallel conversion on the modulation symbols, and allocating the data to different subcarriers;

step 103: performing series-parallel conversion on the data allocated to each subcarrier;

step 104: modulating parallel data corresponding to each subcarrier to multiple Slepian signals orthogonal to each other;

step 105: summing up data corresponding to the same subcarrier but modulated to different Slepian signals;

step 106: modulating summed data corresponding to each subcarrier to a corresponding subcarrier; and step 107: summing up data in all subcarriers to form transmission signals.

In this embodiment, in step 104, the parallel data corresponding to each subcarrier are modulated to the multiple Slepian signals orthogonal to each other by using shaping filters constituted by Slepian signals. In this embodiment, former $N_p \leq \lambda$ signals in the Slepian signals may be used as the shaping filters overlapped each other in each subcarrier.

In this embodiment, the method may be carried out by an analog circuit, and may also be carried out by a digital circuit, which shall be described below, respectively.

Figure 2:
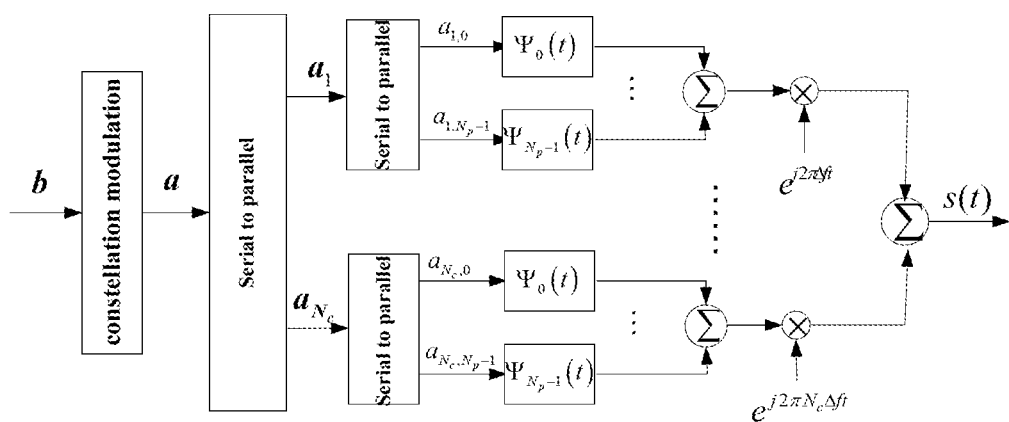
FIG. 2 is a block diagram of functions of a transmitter carrying out the method of Embodiment 1 by an analog circuit.

FIG. 2 is a block diagram of an implementation of a transmitter carrying out the method of this embodiment by an analog circuit. As shown in FIG. 2, in this embodiment, constellation modulation is first performed on an information bit stream b of $N_b \times 1$ (step 101) to obtain an modulation symbol data stream a of $N_a \times 1$. In this embodiment, a method of the constellation modulation is not limited, and such modulation methods as BPSK, QPSK, 8PSK, and 16QAM, etc., may be applicable to this embodiment.

Next, series-parallel conversion is performed on the modulation symbols, and the data are allocated to different subcarriers (step 102). For example, series-parallel conversion is performed on series modulation symbols, such as modulated data streams a, and they are allocated to $N_c$ parallel subcarriers, so as to obtain data streams $a_l$ of $N_p \times 1$; where, $l=1, \ldots, N_c$, and $N_a = N_c \times N_p$.

Thereafter, series-parallel conversion is performed on the data allocated to each subcarrier (step 103), that is, second-time series-parallel conversion is performed on the data streams $a_l$ to obtain $N_p$ parallel data $a_{l,k}$, where, $k=0, \ldots, N_p-1$. As shown in FIG. 2, in this embodiment, second-time series-parallel conversion is performed on the data streams $a_l$ allocated to each subcarrier to obtain $N_p$ parallel data $a_{l,k}$ corresponding to each subcarrier.

Next, the parallel data corresponding to each subcarrier are modulated to multiple Slepian signals orthogonal to each other (step 104). For example, the data $a_{l,k}$ are modulated by a k-th order Slepian signal $\Psi_k(t)$ with a time bandwidth product $\lambda$ to obtain a signal $a_{l,k}\Psi_k(t)$. As shown in FIG. 2, in this embodiment, former $N_p$ Slepian signals, that is, $\Psi_0(t), \ldots, \Psi_{N_p-1}(t)$ are taken as the shaping filters overlapped each other in each subcarrier; where, $N_p \leq \lambda$.

Thereafter, data corresponding to the same subcarrier but modulated to different Slepian signals are summed up (step 105), that is, summation is performed on signals $a_{l,k}\Psi_k(t)$ modulated by the Slepian basis in view of k. As shown in FIG. 2, corresponding to each subcarrier, there exist multiple modulated signals, which are modulated by Slepian signals of different orders, and signals corresponding to the subcarrier may be obtained by summing up the multiple modulated signals.

Next, the summed data corresponding to each subcarrier is modulated to the corresponding subcarrier (step 106). As shown in FIG. 2, signals of an l-th subcarrier may be obtained by performing summation on signals $a_{l,k}\Psi_k(t)$ modulated by the Slepian basis in view of k and modulating it to the l-th subcarrier $e^{-j2\pi l\Delta ft}$:

$$s_l(t) = \sum_{k=1}^{N_p} a_{l,k}\Psi_k(t)e^{-2\pi l\Delta ft}.$$

Finally, the data $s_l(t)$ in all the subcarriers are summed up to form the transmission signals (step 107):

$$s_l(t) = \sum_{l=1}^{N_c}\sum_{k=1}^{N_p} a_{l,k}\Psi_k(t)e^{-j2\pi l\Delta ft}.$$

In the digital implementation method of the multicarrier system based on the Slepian basis of this embodiment, constellation modulation is likewise performed on an information bit stream of $N_b \times 1$ first to obtain an symbol data stream a of $N_a \times 1$; then the data streams a are rearranged by columns into a matrix A of $N_c \times N_p$; a Slepian basis $\Psi$ with the time bandwidth product $\lambda$ and the number of dimensions $N_p \times N$ is generated; where, $N_p \leq \lambda$; a subcarrier matrix E of $N_c \times N$ is generated; where, a value of an element in an l-th row and an n-th column is $e_{l,n} = e^{j2\pi l\Delta fnT_s}$; and transmission signals $s = \text{diag}((A\Psi)^T E)$ of $N \times 1$ are generated; where, $x = \text{diag}(X)$ denotes that diagonal elements in a matrix X of $N \times N$ are taken to form $N \times 1$ vectors x, the vectors x are the transmission signals.

In the method provided in this embodiment, by superimposing mutually-orthogonal Slepian signals in the same bandwidth, out-of-band leakage is lowered while ensuring the spectral efficiency, and robustness to subcarrier frequency offset is improved.

Embodiment 2

Figure 3:
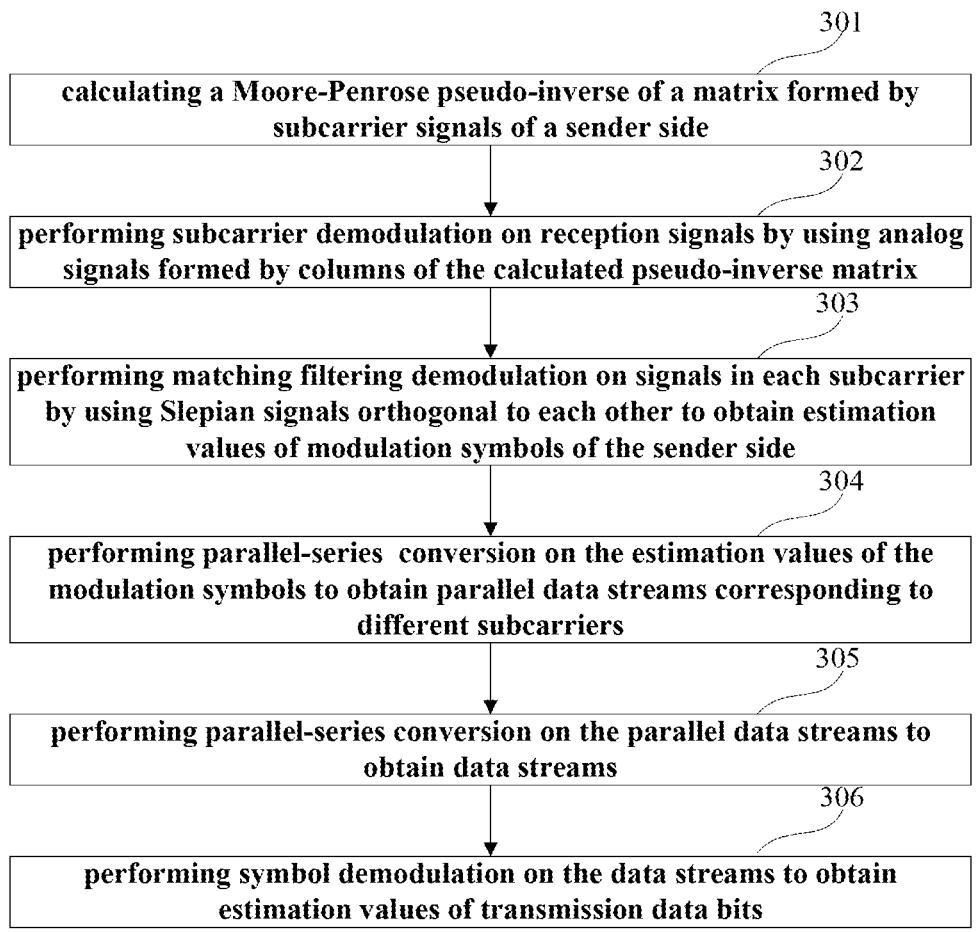
FIG. 3 is a flowchart of the data demodulation method of Embodiment 2.

This embodiment provides a data demodulation method, applicable to a receiver in a multicarrier communication system. FIG. 3 is a flowchart of the method. Referring to FIG. 3, the method includes:

step 301: calculating a Moore-Penrose pseudo-inverse of a matrix formed by subcarrier signals of a sender side;

step 302: performing subcarrier demodulation on reception signals by using analog signals formed by columns of the calculated pseudo-inverse matrix; and step 303: performing matching filtering demodulation on signals in each subcarrier by using Slepian signals orthogonal to each other to obtain estimation values of modulation symbols of the sender side.

In this embodiment, after the estimation values of the modulation symbols of the sender side are obtained, estimation values of transmission data bits may be obtained therefrom. In an implementation, this may be carried out by steps 304-306; however, this embodiment is not limited thereto. As shown in FIG. 3, wherein, step 304: performing parallel-series conversion on the estimation values of the modulation symbols to obtain parallel data streams corresponding to different subcarriers;

step 305: performing parallel-series conversion on the parallel data streams to obtain data streams; and step 306: performing symbol demodulation on the data streams to obtain estimation values of transmission data bits.

In this embodiment, the method may be carried out not only by an analog circuit, but also by a digital circuit, which shall be described below, respectively.

Figure 4:
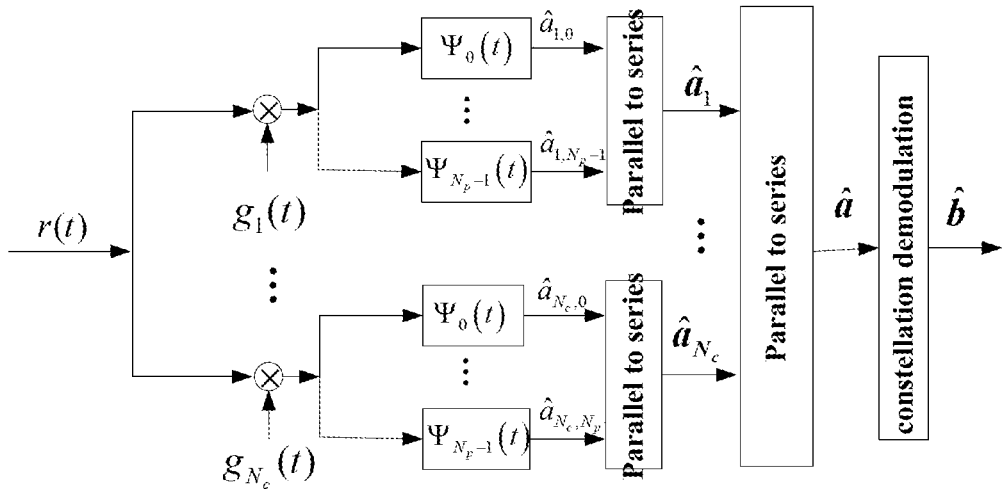
FIG. 4 is a block diagram of functions of a receiver carrying out the method of Embodiment 2 by an analog circuit.

FIG. 4 is a block diagram of an implementation of a receiver carrying out the method of this embodiment by an analog circuit. As shown in FIG. 4, in this embodiment, subcarrier signals $e^{-j2\pi l\Delta ft}$ at the sender side are first written as a subcarrier matrix E of $N_c \times N$, a value of an element in an l-th row and an n-th column being $e_{l,n} = e^{-j2\pi l\Delta fnT_s}$; where, $l=1, \ldots, N_c$.

Next, a Moore-Penrose pseudo-inverse of the matrix formed by the subcarrier signals of the sender side is calculated (step 301), that is, a Moore-Penrose pseudo-inverse matrix $G = E^+$ of the matrix E is calculated; where, the number of dimensions of the matrix G is $N \times N_c$.

Thereafter, subcarrier demodulation is performed on the reception signals by using the analog signals formed by the columns of the calculated pseudo-inverse matrix (step 302), that is, as shown in FIG. 4, an l-th column of the matrix G forms demodulated subcarrier signals $g_l(t)$, and $g_l(t)$ are used to perform subcarrier demodulation on the reception signals r(t), signals $y_l(t) = \int_0^T r(t)g_l(t)dt$ are obtained.

Thereafter, symbol demodulation is performed on the signals in each subcarrier by using the Slepian signals orthogonal to each other to obtain the estimation values of the modulation symbols of the sender side (step 303), that is, as shown in FIG. 4, a matching filtering method may be used to further perform demodulation on signals $y_l(t)$ based on Slepian basis to obtain the estimation values of the modulation symbols $a_{l,k}$, i.e.

$$\hat{a}_{l,k}=\int_0^T y_l(t)\Psi_k(t)dt.$$

In this embodiment, as shown in FIG. 4, parallel-series conversion may further be performed on parallel data streams $\hat{a}_{l,k}$ to obtain $N_c$ parallel data streams $\hat{a}_l$ corresponding to different subcarriers (step 304), then second-time parallel-series conversion may be performed on the parallel data streams $\hat{a}_l$ to obtain a data stream $\hat{a}$ (step 305), and finally, symbol demodulation, such as 16QAM demodulation, is performed on the data stream $\hat{a}$, so as to obtain demodulation information bit stream $\hat{b}$ of $N_b \times 1$.

In the digital implementation method of the multicarrier system based on the Slepian basis of this embodiment, let the reception signals be vectors r of $N \times 1$, and the pseudo-inverse of the subcarrier matrix E of the sender side is calculated to obtain the matrix $G=E^+$ with the number of dimensions being $N \times N_c$, and the estimation values of the modulation symbols are calculated, $\hat{A}=(DIAG(r)G)^T\Psi^T$; where, DIAG (x) denotes that vectors x of $N \times 1$ are written into a diagonal matrix of $N \times N$, satisfying $X_{n,n}=x_n$; the matrix $\hat{A}$ of $N_c \times N_p$ are rearranged by columns to form estimation values $\hat{a}$ of a vector of $N_b \times 1$; and constellation demodulation is performed on $\hat{a}$ of $N_b \times 1$ to obtain an information stream $\hat{b}$ with the number of dimensions being $N_b \times 1$.

In the method provided in this embodiment, by superimposing mutually-orthogonal Slepian signals in the same bandwidth, out-of-band leakage is lowered while ensuring the spectral efficiency, and robustness to subcarrier frequency offset is improved.

Embodiment 3

This embodiment provides a transmitter in a multicarrier communication system. As principles of the transmitter are similar to that of the method of Embodiment 1, the implementation of the method of Embodiment 1 may be referred to for the implementation of the transmitter, with identical contents being not going to be described herein any further.

Figure 5:
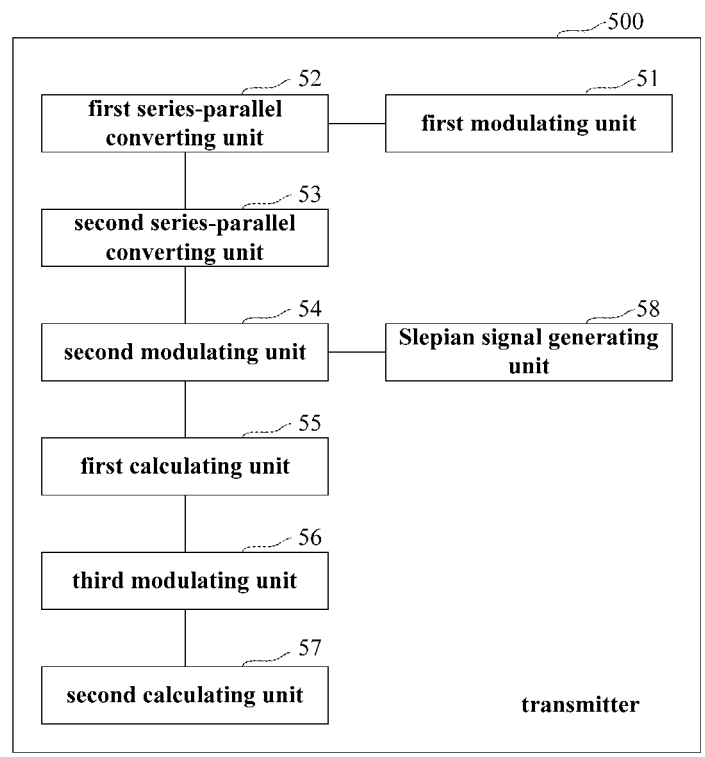
FIG. 5 is a schematic diagram of a structure of the transmitter of Embodiment 3.

FIG. 5 is a schematic diagram of a structure of the transmitter of this embodiment. As shown in FIG. 5, the transmitter 500 includes: a first modulating unit 51, a first series-parallel converting unit 52, a second series-parallel converting unit 53, a second modulating unit 54, a first calculating unit 55, a third modulating unit 56, and a second calculating unit 57; wherein, the first modulating unit 51 is configured to perform constellation modulation on an information bit stream of data to be transmitted to obtain modulation symbols of the data to be transmitted;

the first series-parallel converting unit 52 is configured to perform series-parallel conversion on the modulation symbols, and allocate the data to different subcarriers;

the second series-parallel converting unit 53 is configured to perform series-parallel conversion on the data allocated to each subcarrier;

the second modulating unit 54 is configured to modulate parallel data corresponding to each subcarrier to multiple Slepian signals orthogonal to each other; wherein, the second modulating unit 54 may be realized by shaping filters of multiple Slepian signals;

the first calculating unit 55 is configured to sum up data corresponding to the same subcarrier but modulated to different Slepian signals; wherein, the first calculating unit 55 may be realized by multiple adders;

the third modulating unit 56 is configured to modulate summed data corresponding to each subcarrier to a corresponding subcarrier; wherein, the third modulating unit 56 may be realized by multiple multipliers;

and the second calculating unit 57 is configured to sum up data in all subcarriers to form transmission signals; wherein, the second calculating unit 57 may be realized by an adder.

Alternatively, in this embodiment, the transmitter 500 may further include a Slepian signal generating unit 58 configured to generate Slepian signals and provide them to the second modulating unit 54, so that the second modulating unit 54 modulates the data corresponding to each subcarrier to the Slepian signals orthogonal to each other by using the Slepian signals as shaping filters.

In this embodiment, the components of the transmitter 500 may be realized by analog circuits, and may also be realized by digital circuits.

In the transmitter of this embodiment, by superimposing mutually-orthogonal Slepian signals in the same bandwidth, out-of-band leakage is lowered while ensuring the spectral efficiency, and robustness to subcarrier frequency offset is improved.

Embodiment 4

This embodiment provides a receiver in a multicarrier communication system. As principles of the receiver are similar to that of the method of Embodiment 2, the implementation of the method of Embodiment 2 may be referred to for the implementation of the receiver, with identical contents being not going to be described herein any further.

Figure 6:
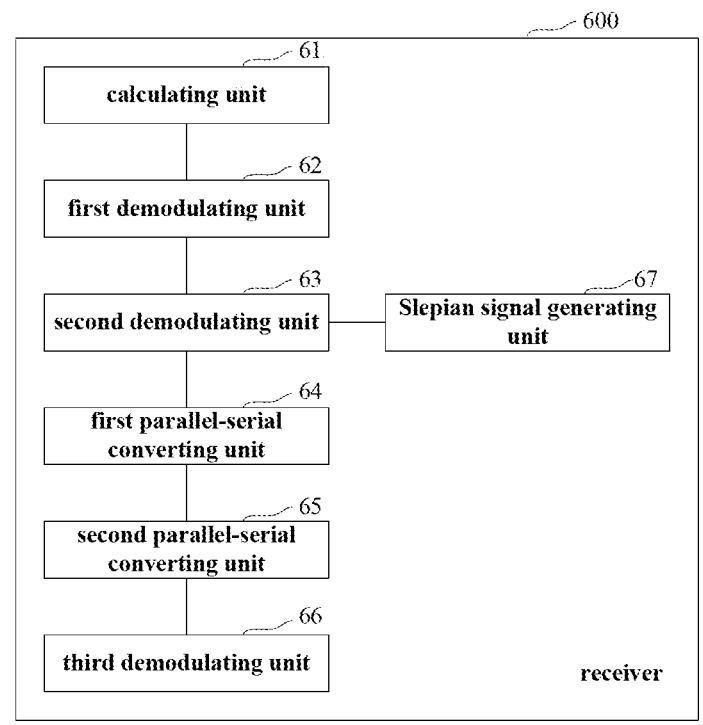
FIG. 6 is a schematic diagram of a structure of the receiver of Embodiment 4.

FIG. 6 is a schematic diagram of a structure of the receiver of this embodiment. As shown in FIG. 6, the receiver 600 includes: a calculating unit 61, a first demodulating unit 62, and a second demodulating unit 63. Alternatively, the receiver 600 may further include a first parallel-serial converting unit 64, a second parallel-serial converting unit 65, and a third demodulating unit 66; wherein, the calculating unit 61 is configured to calculate a Moore-Penrose pseudo-inverse of a matrix formed by subcarrier signals of a sender side;

the first demodulating unit 62 is configured to perform subcarrier demodulation on reception signals by using analog signals formed by columns of the pseudo-inverse matrix calculated by the calculating unit 61; wherein, the first demodulating unit 62 may be realized by multiple digital-to-analog converters;

the second demodulating unit 63 is configured to perform matching filtering demodulation on signals in each subcarrier by using Slepian signals orthogonal to each other to obtain estimation values of modulation symbols of the sender side; wherein, the second demodulating unit 63 may be realized by multiple matching filters of Slepian signals;

the first parallel-serial converting unit 64 is configured to perform parallel-serial conversion on the estimation values of the modulation symbols to obtain parallel data streams corresponding to different subcarriers;

the second parallel-serial converting unit 65 is configured to perform parallel-serial conversion on the parallel data streams to obtain a data stream;

and the third demodulating unit 66 is configured to perform symbol demodulation (i.e. constellation demodulation) on the data stream to obtain estimation values of transmission data bits.

Alternatively, in this embodiment, the receiver 600 may further include a Slepian signal generating unit 67 configured to generate Slepian signals and provide them to the second demodulating unit 63, so that the second demodulating unit 63 performs matching filtering demodulation on signals in each subcarrier by using the Slepian signals.

In the receiver of this embodiment, by superimposing mutually-orthogonal Slepian signals in the same bandwidth, out-of-band leakage is lowered while ensuring the spectral efficiency, and robustness to subcarrier frequency offset is improved.

Embodiment 5

Figure 7:
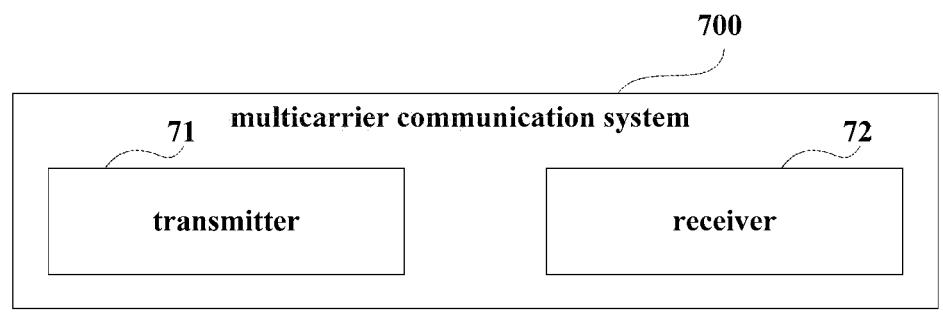
FIG. 7 is a schematic diagram of a structure of the multicarrier communication system of Embodiment 5.

This embodiment provides a multicarrier communication system. FIG. 7 is a schematic diagram of topology of the multicarrier communication system. As shown in FIG. 7, the multicarrier communication system 700 includes a transmitter 71 and a receiver 72; wherein, the transmitter 71 may be configured to:

perform constellation modulation on an information bit stream of data to be transmitted to obtain modulation symbols of the data to be transmitted;

perform series-parallel conversion on the modulation symbols, and allocate the data to different subcarriers;

perform series-parallel conversion on the data allocated to each subcarrier;

modulate parallel data corresponding to each subcarrier to multiple Slepian signals orthogonal to each other;

sum up data corresponding to the same subcarrier but modulated to different Slepian signals;

modulate summed data corresponding to each subcarrier to a corresponding subcarrier; and sum up data in all subcarriers to form transmission signals.

Furthermore, the transmitter 71 may be configured to: generate Slepian signals, so that the transmitter modulates the data corresponding to each subcarrier to the Slepian signals orthogonal to each other by using the Slepian signals.

In this embodiment, the transmitter 71 may be realized by the transmitter of Embodiment 3, and shall not be described herein any further.

And the receiver 72 may be configured to:

calculate a Moore-Penrose pseudo-inverse of a matrix formed by subcarrier signals of a sender side;

perform subcarrier demodulation on reception signals by using analog signals formed by columns of the calculated pseudo-inverse matrix; and perform matching filtering demodulation on signals in each subcarrier by using Slepian signals orthogonal to each other to obtain estimation values of modulation symbols of the sender side.

Furthermore, the receiver 72 may be configured to: perform parallel-serial conversion on the estimation values of the modulation symbols to obtain parallel data streams corresponding to different subcarriers; perform parallel-serial conversion on the parallel data streams to obtain data streams; and perform symbol demodulation on the data streams to obtain estimation values of transmission data bits.

Furthermore, the receiver 72 may be configured to: generate Slepian signals, so that the receiver performs matching filtering demodulation on signals in each carrier by using the Slepian signals.

In this embodiment, the receiver 72 may be realized by the receiver of Embodiment 4, and shall not be described herein any further.

In the multicarrier communication system of this embodiment, by superimposing mutually-orthogonal Slepian signals in the same bandwidth, out-of-band leakage is lowered while ensuring the spectral efficiency, and robustness to subcarrier frequency offset is improved.

The methods, apparatuses and system of the embodiments of the present disclosure are described above. Following description is given to a simulation result using the system of the embodiment.

1. Simulation Parameters

It is assumed that a channel is an additive white Gaussian noise (AWGN) channel, and QPSK modulation is performed on information bit streams b; a carrier frequency of a transmission signal is $f_0$=2.6 GHz, a moving speed of a terminal is v=350 km/h, then a coherent time of the channel is:

$$T_c = \frac{3 \times 10^8}{2.6 \times 10^9 \times 350 \times 10^3 / 3600} \approx 1.2 \text{ ms.}$$

Let a symbol length be $$T = \frac{T_c}{3} = 0.4 \text{ ms,}$$

and let latency expansion of the channel be $\sigma_\tau$=5 μs, then let a subcarrier interval be $$\Delta f = \frac{1}{1.5\sigma_\tau} = 0.13 \text{ MHz;}$$

then a time bandwidth product of the Slepian basis is $\lambda$=T$\Delta$f=53, and let former $N_p$=49 of the 53 mutually-orthogonal Slepian signals are totally used in each subcarrier; let a sampling frequency be 1.16 μs, then there are totally N=1033 sampling points, then a normalized bandwidth is $$W = \frac{\lambda}{2N} = 0.0256;$$

in order to ensure that there are an integral number of subcarriers within the whole signal bandwidth, the subcarrier interval $\Delta$f is modified as $\Delta$f=1/$\lfloor$½W$\rfloor$; where, $\lfloor$a$\rfloor$ denotes down rounding of a; likewise, a value of the spectral efficiency is also modified as:

$$\eta = \frac{N_p}{N \times 1/\lfloor 1/2W \rfloor} = \frac{N_p \lfloor 1/2W \rfloor}{N}.$$

2. Comparison of Out-of-Band Leakage

The multicarrier system based on the Slepian basis proposed by the embodiment of the present disclosure has out-of-band leakage smaller than that of an OFDM system. In particular, the shaping filters used by the OFDM are rectangular signals, and a peak value of the first side lobe of the waveform in frequency domain is lower than a peak value of the main lobe by 13 dB only. While in the multicarrier system based on the Slepian basis, with the above simulation parameters, a variation range of a difference between a peak value of the major lobe and a peak value of the side lobe of the Slepian signals is 50 dB-280 dB.

3. Comparison of Bit Error Rate Performance

Figure 8:
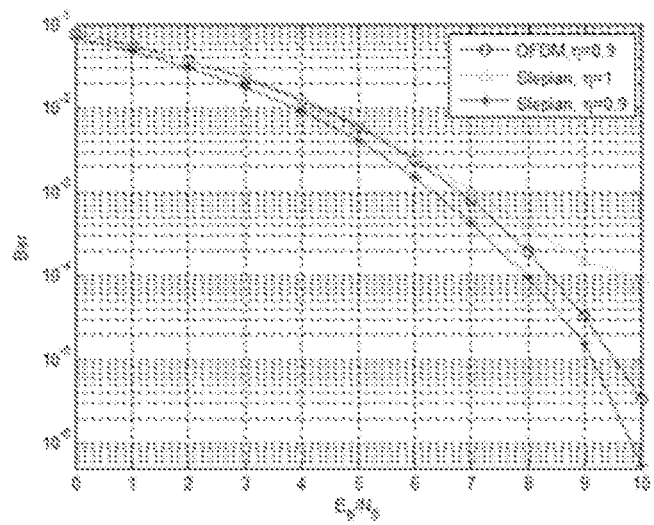
FIG. 8 is a schematic diagram of comparison of bit error rates.

FIG. 8 is a schematic diagram of comparison of bit error rates of the multicarrier system of the embodiment of the present disclosure and the OFDM system. First, when the spectral efficiency is η=1, that is, when the signals of all orders of the Slepian basis are used as shaping filters and $$\frac{E_b}{N_0} < 5 \text{ dB},$$

the multicarrier system of the embodiment of the present disclosure and the OFDM system have the same bit error rate performance; however, when $$\frac{E_b}{N_0} > 5 \text{ dB},$$

the multicarrier system of the embodiment of the present disclosure has a higher bit error rate.

However, in practice, in order to avoid interference between different OFDM systems, a protection interval is still needed to be reserved; for example, in an LTE system, a spectral efficiency of the system is η=0.9. It is shown in the simulation result in FIG. 8 that under the condition of the same spectral efficiency of η=0.9, the multicarrier system based on the Slepian basis proposed by the embodiment of the present disclosure has a lower bit error rate in comparison with the OFDM systems.

Figure 9:
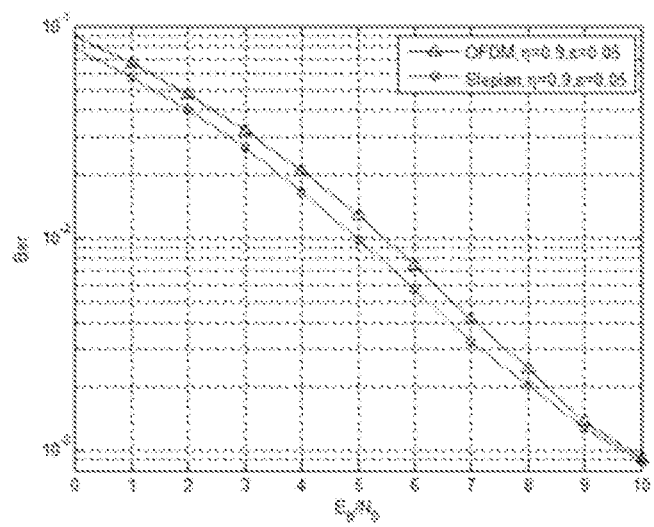
FIG. 9 is another schematic diagram of comparison of bit error rates.

FIG. 9 is a schematic diagram of comparison of bit error rate performance of the multicarrier system of the embodiment of the present disclosure and the OFDM systems when there exists a subcarrier offset. In FIG. 9, ε denotes a ratio of a subcarrier frequency offset to a subcarrier interval, that is, a relative subcarrier offset. The simulation result of FIG. 9 shows that when η=0.9 and ε=0.05, the multicarrier system based on the Slepian basis proposed by the embodiment of the present disclosure has a lower bit error rate.

An embodiment of the present disclosure further provides a computer-readable program, wherein when the program is executed in a transmitter, the program enables a computer to carry out the method as described in Embodiment 1 in the transmitter.

An embodiment of the present disclosure provides a storage medium in which a computer-readable program is stored, wherein the computer-readable program enables a computer to carry out the method as described in Embodiment 1 in a transmitter.

An embodiment of the present disclosure further provides a computer-readable program, wherein when the program is executed in a receiver, the program enables a computer to carry out the method as described in Embodiment 2 in the receiver.

An embodiment of the present disclosure provides a storage medium in which a computer-readable program is stored, wherein the computer-readable program enables a computer to carry out the method as described in Embodiment 2 in a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principles of the present disclosure, and such variants and modifications fall within the scope of the present disclosure.

What is claimed is:

1. A transmitter in a multicarrier communication system, comprising:
    a first modulating unit configured to perform constellation modulation on an information bit stream of data to be transmitted to obtain modulation symbols of the data to be transmitted;
    a first series-parallel converting unit configured to perform series-parallel conversion on the modulation symbols, and allocate the data to different subcarriers;
    a second series-parallel converting unit configured to perform series-parallel conversion on the data allocated to each subcarrier;
    a second modulating unit configured to modulate parallel data corresponding to each subcarrier to multiple Slepian signals orthogonal to each other;
    a first calculating unit configured to sum up data corresponding to the same subcarrier but modulated to different Slepian signals;
    a third modulating unit configured to modulate summed data corresponding to each subcarrier to a corresponding subcarrier; and
    a second calculating unit configured to sum up data in all subcarriers to form transmission signals.

2. The transmitter according to claim 1, wherein the transmitter further comprises:
    a Slepian signal generating unit configured to generate Slepian signals and provide them to the second modulating unit, so that the second modulating unit modulates the data corresponding to each subcarrier to the Slepian signals orthogonal to each other by using the Slepian signals.

3. A receiver in a multicarrier communication system, comprising:
    a calculating unit configured to calculate a Moore-Penrose pseudo-inverse of a matrix formed by subcarrier signals of a sender side;
    a first demodulating unit configured to perform subcarrier demodulation on reception signals by using analog signals formed by columns of the calculated pseudo-inverse matrix; and
    a second demodulating unit configured to perform matching filtering demodulation on signals in each subcarrier by using Slepian signals orthogonal to each other to obtain estimation values of modulation symbols of the sender side.

4. The receiver according to claim 3, wherein the receiver further comprises:
    a first parallel-serial converting unit configured to perform parallel-serial conversion on the estimation values of the modulation symbols to obtain parallel data streams corresponding to different subcarriers;

a second parallel-serial converting unit configured to perform parallel-serial conversion on the parallel data streams to obtain a data stream; and a third demodulating unit configured to perform symbol demodulation on the data stream to obtain estimation values of transmission data bits.

5. The receiver according to claim 4, wherein the receiver further comprises:

a Slepian signal generating unit configured to generate Slepian signals and provide them to the second demodulating unit, so that the second demodulating unit performs matching filtering demodulation on signals in each subcarrier by using the Slepian signals.

6. A multicarrier communication system, comprising a transmitter and a receiver, wherein, the transmitter is configured to:

perform constellation modulation on an information bit stream of data to be transmitted to obtain modulation symbols of the data to be transmitted;

perform series-parallel conversion on the modulation symbols, and allocate the data to different subcarriers;

perform series-parallel conversion on the data allocated to each subcarrier;

modulate parallel data corresponding to each subcarrier to multiple Slepian signals orthogonal to each other;

sum up data corresponding to the same subcarrier but modulated to different Slepian signals;

modulate summed data corresponding to each subcarrier to a corresponding subcarrier; and sum up data in all subcarriers to form transmission signals;

and the receiver is configured to:

calculate a Moore-Penrose pseudo-inverse of a matrix formed by subcarrier signals of a sender side;

perform subcarrier demodulation on reception signals by using analog signals formed by columns of the calculated pseudo-inverse matrix; and perform matching filtering demodulation on signals in each subcarrier by using Slepian signals orthogonal to each other to obtain estimation values of modulation symbols of the sender side.

7. The system according to claim 6, wherein the transmitter is further configured to:

generate Slepian signals, so that the transmitter modulates the data corresponding to each subcarrier to the Slepian signals orthogonal to each other by using the Slepian signals.

8. The system according to claim 6, wherein the receiver is further configured to:

perform parallel-serial conversion on the estimation values of the modulation symbols to obtain parallel data streams corresponding to different subcarriers;

perform parallel-serial conversion on the parallel data streams to obtain a data stream; and perform symbol demodulation on the data stream to obtain estimation values of transmission data bits.

9. The system according to claim 8, wherein the receiver is further configured to:

generate Slepian signals, so that the receiver performs matching filtering demodulation on signals in each carrier by using the Slepian signals.

* * * * *